UNITED STATES PATENT OFFICE.

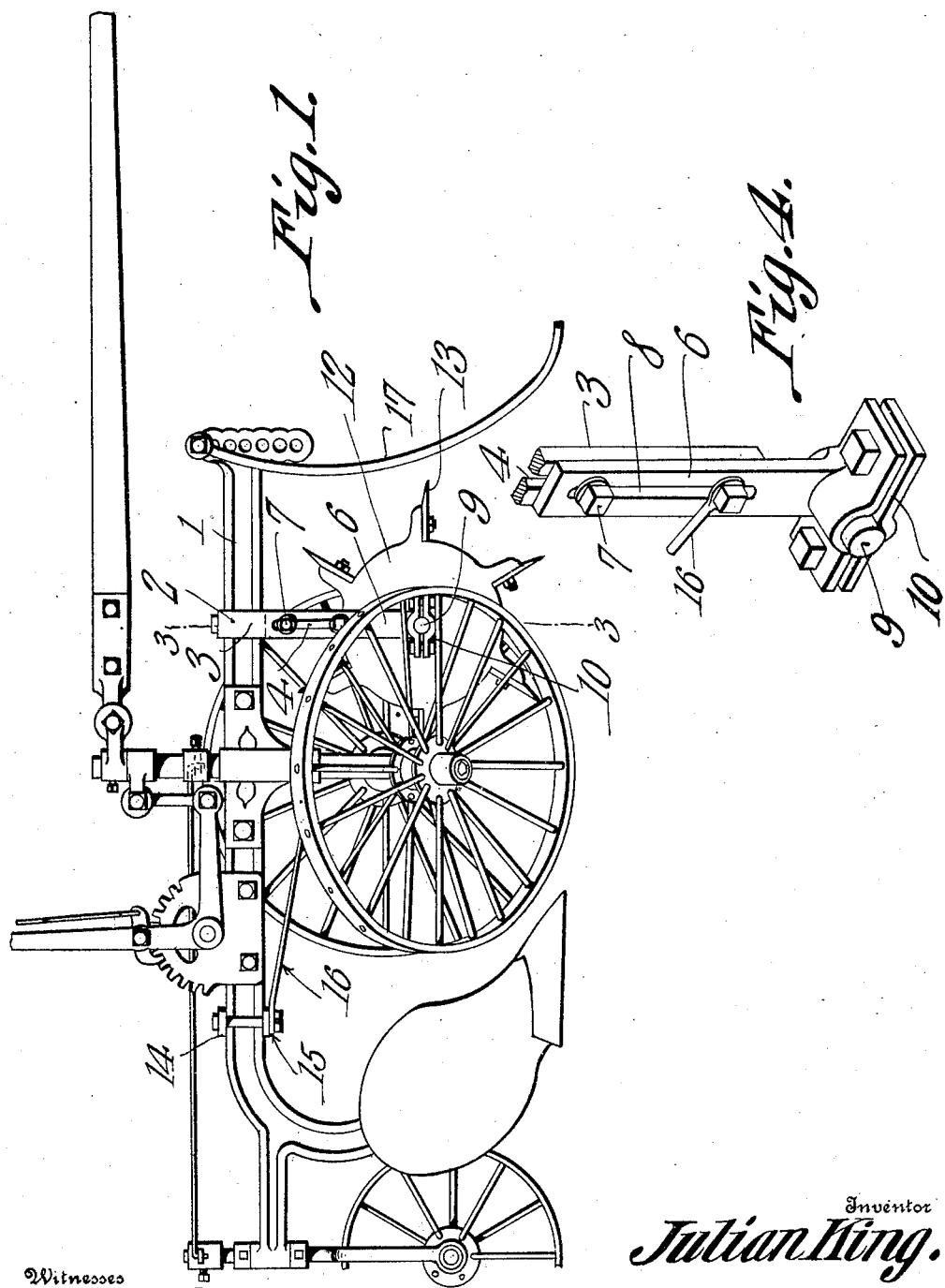

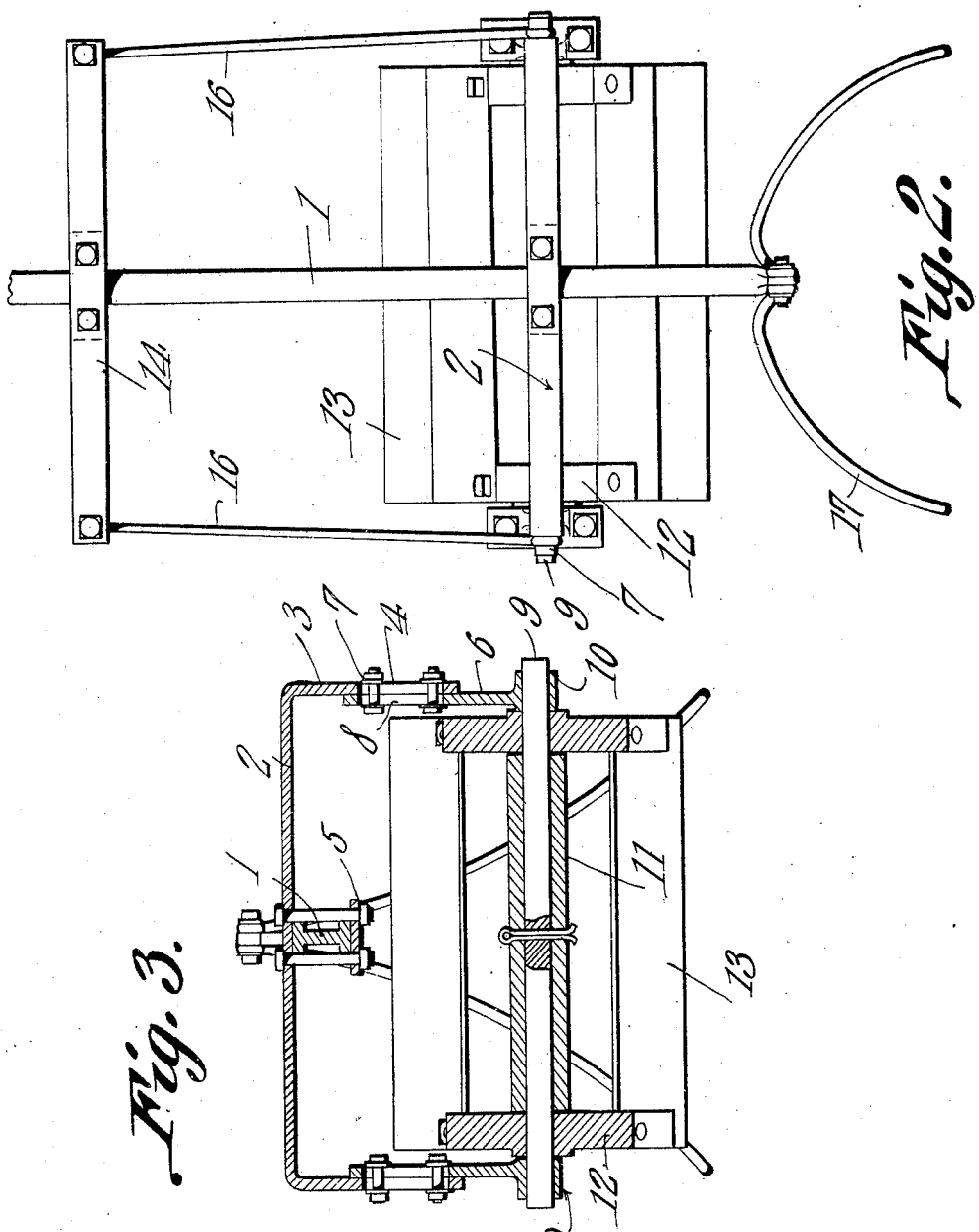

JULIAN KING, OF TUXEDO, TEXAS.

STALK-CHOPPER.

972,197.

Specification of Letters Patent.   Patented Oct. 11, 1910.

Application filed January 11, 1910.   Serial No. 537,534.

*To all whom it may concern:*

Be it known that I, JULIAN KING, a citizen of the United States, residing at Tuxedo, in the county of Jones and State of Texas, have invented a new and useful Stalk-Chopper, of which the following is a specification.

This invention has relation to stalk choppers and it consists in the novel construction and arrangement of its parts as hereinafter shown and described.

The object of the invention is to provide a simple and effective stalk chopper in the form of an attachment adapted to be applied to a breaking plow to operate upon the stalks at the surface and just below the surface of the soil during the breaking operation.

With the above object in view the chopper includes a frame adapted to be applied to the plow beam and having at its ends vertically disposed arms which are adjustably mounted. A shaft is fixedly held at the lower ends of the arms and a sleeve is fixed to the intermediate portion of the shaft. Disks are journaled upon the end portions of the shaft beyond the ends of the sleeve and chopping blades are carried by the said disks. A cross bar is applied to the plow beam behind the said frame and braces extend from the said cross bar to the frame which supports the chopping element. Rakes are adapted to be attached to the forward portion of the plow beam and are designed to draw the stalks which may lie in transverse position into alinement approximately parallel with the line of draft of the plow whereby they may be effectually operated upon by the blades carried by the rotating disks.

In the accompanying drawings, Figure 1 is a side elevation of the breaking plow with the stalk chopper applied thereto. Fig. 2 is a top plan view of a portion of the plow beam with the stalk chopper applied thereto. Fig. 3 is a vertical sectional view of the stalk chopper applied to a plow beam. Fig. 4 is a detail perspective view of a portion of the frame which carries the chopping element.

The stalk chopping device is adapted to be applied to the beam 1 of a breaking plow and consists of a cross bar or frame 2 having downwardly disposed end portions 3 provided with elongated slots 4 and having at its middle a clamp device 5 adapted to engage the beam 1. Vertically disposed arms 6 are adjustably fastened to the downwardly disposed end portion of the bar 1 by means of clamp bolts 7 which pass transversely through the slots 4 and corresponding slots 8 provided in the said arms 6. A shaft 9 is held in fixed position at the lower end of the arms 6 by means of clamps 10. A sleeve 11 is fixed to the intermediate portion of the shaft 9 and disks 12 are journaled for rotation upon the end portions of the said shaft 9 beyond the ends of the sleeve 11. Chopping blades 13 are carried by the disks 12. A cross bar 14 is mounted upon the rear portion of the beam 1 and is held in position by means of a clamp device 15. Braces 16 are attached at their rear ends to the end portions of the cross bar 14 and at their forward ends are connected with one of the bolts 7 and serve as means for bracing the arms 6 in position against the strain to which the disks 12 and blades 13 are subjected during the cutting operation. Rakes 17 are secured to the forward portion of the beam 1 (preferably at the clevis thereof) and have their lower end portions approximately lying in the same vertical planes as the ends of the blades 13. When the stalk chopper is thus applied to the beam of a plow and the plow is drawn in a forward direction during the plowing operation the drag of the plow hopper upon the rear end of the beam 1 has a tendency to cause the forward end of the beam 1 to incline toward the ground. Thus the blade 13 will be forced down into the soil for a considerable distance below the surface thereof and will operate upon the stalk at the surface and below the surface of the soil. As the rakes 17 engage the stalks in advance of the blades 13 the said rakes will have a tendency to pull the stalks parallel or approximately so with the line of draft of the plow and consequently the blades 13 which are transversely disposed with relation to the line of draft of the plow will have a better opportunity to engage the stalks and divide them into lengths. It will be seen that by adjusting the arms 6 upon the lower portions of the downwardly extending portion 3 of the cross bar 2 that the extent to which the blades 13 will operate close to the surface of the soil will be regulated. Thus it will be seen that a simple and an effective stalk chopper in the form of an attachment for a breaking plow is provided, and that when the parts are assembled upon the plow beam they may be properly adjusted to meet conditions in order to properly sever the stalk at and below the surface of the soil.

Having described the invention what I claim as new and desire to secure by Letters Patent is:—

A stalk chopper comprising a cross frame having downwardly disposed end portions, means for attaching said frame to a plow beam, arms adjustably connected with the downwardly extending portions of the cross frame, a shaft positively fixed at the lower ends of the arms, a sleeve fixed to the intermediate portion of said shaft, disks journaled upon the shaft at the ends of the sleeve and chopping blades fixed to the disks.

In testimony that I claim the foregoing as my own, I have hereto affixed my signature in the presence of two witnesses.

JULIAN KING.

Witnesses:
W. T. PHILLIPS,
U. WALKER.